United States Patent [19]

Chandross et al.

[11] 3,772,104

[45] Nov. 13, 1973

[54] FABRICATION OF THIN FILM DEVICES

[75] Inventors: Edwin Arthur Chandross, Murray Hill; Theodore Arthur Shankoff, Mendham, both of N.J.

[73] Assignee: Bell Telephone Laboratories, Incorporated, Murray Hill, Berkeley Heights, N.J.

[22] Filed: Mar. 30, 1972

[21] Appl. No.: 239,497

[52] U.S. Cl. .......... 156/18, 156/8, 252/79.1
[51] Int. Cl. .......... C23f 1/00, C23f 1/02
[58] Field of Search .......... 252/79.1; 156/8, 156/18

[56] References Cited

UNITED STATES PATENTS 2,566,615 9/1951 Keilholtz et al. .......... 156/18 X

*Primary Examiner*—William A. Powell
*Attorney*—W. L. Keefauver

[57] ABSTRACT

A process is described for the fabrication of devices in which thin films of tungsten are etched by a chemical procedure. This chemical procedure involves the use of ferricyanide as the oxidizing agent contained in an aqueous solution. The solution also contains a substance with an affinity for protons to promote the etching reaction. The pH of the etching solution is between 7 and 10 but can be higher if desired. Such etching solutions not only yield etching rates of practical interest, but are usable with photoresists which are ordinarily attacked at high pH. In cases where enhanced etching resolution and uniformity is of particular importance, a special procedure is described which involves spraying the etchant and spinning the sample.

8 Claims, 3 Drawing Figures

FABRICATION OF THIN FILM DEVICES

BACKGROUND OF THE INVENTION

1. Field of the Invention

The invention relates to a process for the fabrication of tungsten thin film devices and in particular to the chemical etching of tungsten thin films.

2. Description of the Prior Art

In the evolution of modern technology, especially technology related to microelectronics, the use of metal conductive thin films has become of increasing importance. A variety of metals has been used, but many have limitations. For example, many such conductive metals exhibit poor adhesion, so that elaborate techniques such as the use of multiple metal layers are required to obtain adequate adhesion. This increases the complexity and the cost of fabricating these devices. Other metals are reactive, which limits the lifetime of the metal thin films.

The use of tungsten in such thin films appears to be particularly attractive bcause of its good adhesion properties and its relatively low reactivity even at elevated temperatures. The principal disadvantage has been the difficulty in etching tungsten thin films (see the article entitled "Thin Film Processes for Microelectronic Application" by Lawrence V. Gregor, in the *Proceedings of the IEEE*, Vo. 59, No. 10, pp. 1,390–1,403, 1971).

Present processes used for etching tungsten involve the use of ferricyanide in strongly basic solutions (pH values greater than 12). A typical etching solution is given by Smithells' *Tungsten*, Chemical Publishing Co., Inc., New York, N. Y., Third Edition, page 121. It is composed of equal volumes 10 percent solution of caustic soda (NaOH) and 30 percent of potassium ferricyanide. Such a solution would have a concentration of base greater than one molar and a pH near 14.

Such strong solutions do indeed etch tungsten at reasonable rates, but they also attack both negative photoresists and positive photoresists presently used in the fabrication of thin film devices. Such etching solutions are either incompatible with the use of photolithographic techniques or severely limit the resolution and therefore the types of devices which can be made using tungsten thin films. For example, most commonly available positive photoresists are actually dissolved away at pH 14 in less than one minute and lose their masking ability at pH 12 in less than one minute through loss adhesion. Even negative resists which are more alkali resistant are useless at pH above 13.

Various attempts have been made to increase the etching rate and thereby reduce the amount of time the photoresist is exposed to the high pH etching solution. One method, described in an article entitled "Electrochemical Delineation of Tungsten Films for Microelectronic Devices" by W. Kern and J. M. Shaw, *J. Electrochem. Soc.*, 118, 1699 (1971), uses electrolytic etching in an aqueous solution of potassium hydroxide and potassium ferricyanide (each 5 percent by weight). However, the photoresist is still being exposed to a high pH solution which limits the resolution of the pattern being generated. Also, the use of an electrolytic technique increases the complexity of the process greatly and makes the process unattractive economically.

To date, attempts to avoid this problem by using lower pH solutions have not been successful. For example, reduction of pH to the point of photoresist stability by dilution reduces the etch rate to where it is no longer of any practical use.

SUMMARY OF THE INVENTION

The invention is a process for the fabrication of tungsten thin film dqvices. Etching of the tungsten thin film is carried out in an aqueous ferricyanide solution containing a proton acceptor with basicity constant (see *Acid Base Equilibria* by E. J. King, Pergamen Press, New York, 1965) between $10^{-2}$ and $10^{-10}$. Concentration of ferricyanide is between 0.01 and 2 M. The mole concentration of the proton acceptor should be between 0.1 and 100 times the concentration of ferricyanide. the pH of the solution is preferably between 7 and 10 although higher pH can be used where photoresist stability is not a problem. Where adjustment of pH is necessary the solution may contain a quantity of the conjugate proton donor (substance formed by adding a proton to the proton acceptor).

There is a preferred class of proton acceptors which have basicity constants between $10^{-3}$ and $10^{-8}$. The lower limit occurs because beyond this limit the etching rate often becomes too slow for many applications. Above the upper limit considerable amounts of conjugate proton donors are required to bring the pH of the solution within the range of 7–10. These solutions exhibit etching rates of practical importance in the fabrication of tungsten thin film devices and do not attack photoresist use in these fabrication techniques.

DETAILED DESCRIPTION

Mechanism of Tungsten Oxidation

Figure 1:
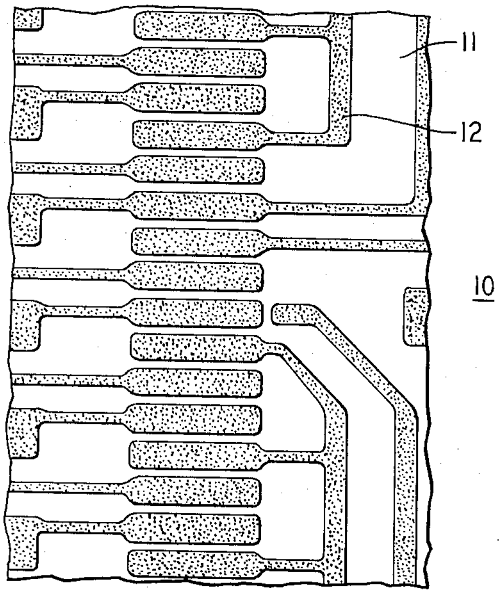
FIG. 1 is a top view of a printed electronic circuit made in accordance with the invention.

An understanding of the invention is facilitated by a description of certain experiments which shed light on the mechanism of tungsten oxidation. First it is known that tungsten metal is passive to chemical attack by mild oxidizing agents such as ferricyanide in acid solution. (See, for example, Advanced Inorganic Chemistry by F. A. Cotton and G. Wilkinson, Interscience Publishers, Second Edition, 1966, page 933 and Mellor's Modern Inorganic Chemistry by G. D. Parks, John Wiley and Sons, New York, 1967, pp. 878 and 881). Further, as described above, the rate of oxidation increases with increasing pH in strong base solution. In experiments with powdered tungsten metal it is found that 1 mole of tungsten reacts with approximately 6 moles of ferricyanide and that the ferricyanide is converted in approximately equal mole amounts to ferrocyanide. Standard analytical procedures also show that the resultant tungsten product is in the form of $WO_4^{-2}$. These results are consistent with the following chemical equation to represent oxidation of tungsten by ferricyanide:

$$W + 6Fe(CN)_6^{-3} + 4H_2O = WO_4^{-2} + 6Fe(CN)_6^{-4} + 8H^+$$

The Proton-Acceptor

The invention resides in the discovery that the high rates of tungsten etching in ferricyanide solution, reportedly only obtainable in high pH solutions, are also obtainable in solutions of proton acceptor in which the pH is near neutral or slightly basic. This discovery is illustrated by the data given in TABLE 1:

TABLE I

Etch Rate as a Function of pH for Aqueous 0.1 M $K_3Fe(CN)_6$ Solutions with 1 M an exemplary Proton Acceptor Plus Conjugate Proton Donor

| pH | Rate (Å/min) |
|---|---|
| 12.0 | 4600 |
| 11.0 | 5000 |
| 10.0 | 4800 |
| 9.0 | 4500 |
| 8.5 | 4300 |
| 8.0 | 4600 |
| 7.7 | 4800 |
| 7.5 | 4000 |
| 7.3 | 3300 |
| 7.1 | 1400 |
| 6.9 | 600 |

Here etching experiments were carried out in aqueous 0.1 M $K_3Fe(CN)_6$ solutions. The pH was varied by altering the mole ratio of conjugate proton donor to proton acceptor. For example, at pH = 12, no conjugate proton donor is present and the mole ratio is zero. At pH = 8, the mole ratio is approximately 85. As can be seen, the etch rate is practically unaffected by reduction in pH down to 7.5. Useful etch rates remain even down to a pH of 7.0. Below pH 7.0, the metal becomes passive to oxidation in ferricyanide solution.

In accordance with the invention, the chemical equation for the etching reaction is $$W + 6Fe(CN)_6^{-3} + 4H_2O + 8A^x = WO_4^{-2} + 6Fe(CN)_6^{-4} + 8HA^{x+1}$$

where $A^x$ is the proton acceptor with a charge of $x$ and $HA^{x+1}$ is the conjugate proton donor with charge of (x+1). This chemical equation indicates that increased concentration of proton acceptor promotes the etching reaction in agreement with the data in FIG. 2. In addition, the difference between the chemical equations (given above) for tungsten etching with and without proton acceptor corresponds to the reaction $$H^+ + A^x = HA^{x+1}$$

with equilibrium constant $$K_a = [H^+][A^x]/[HA^{x+1}]$$

Reducing the equilibrium constant promotes the etching reaction. It is more convenient to express this equilibrium constant in terms of the basicity constant $$K_b = [HA^{x+1}]\,[OH^-]/[A^x] = K_w/K_a$$

where $K_w = [H^+][OH^-]$. The basicity constant $K_b$ refers to the equilibrium $$A^x + H_2O = HA^{x+1} + OH^-$$

where $A^x$ is the proton acceptor with charge $x$ and $HA^{x+1}$ is the conjugate proton donor. Proton acceptors with larger values of $K_b$ promote the etching reaction. The choice of proton acceptor is limited to those with $K_b$ greater than $10^{-10}$ so as to obtain an etching reaction with a rate great enough for practical interest.

In fabrication of devices which utilize photoresist material the pH is preferably less than 10 but may be greater where photoresist stability is not a problem. This upper limit is set by interaction with the photoresist material presently in use rather than effects involving etch rate. Substances with high proton affinities increase the pH of the etching solution. The pH can be reduced to some extent by adding the conjugate proton donor. Any amount may be added but practical considerations such as solubility, etc., might limit this amount to 1,000 or even 100 times the molar amount of proton acceptor. This limits the choice of proton acceptor to whose with $K_b$ less than $10^{-2}$.

Proton acceptors with $K_b$ between $10^{-3}$ and $10^{-8}$ are preferred. Proton acceptors with $K_b$ less than $10^{-8}$ yield etching rate too slow for many applications. Above $10^{-3}$, large amounts of conjugate proton donor are required to adjust the pH to the desired range. The pH range may also be further limited in some applications.

Ferricyanide ion may be introduced into the etching solution by any convenient method that forms a soluble ferricyanide solution. The addition of an alkali-metal ferricyanide such as $K_3Fe_3(CN)_6$ is particularly convenient because such compounds are available commercially. Temperature of the solution may vary from the freezing point of the solution to the boiling point of the solution. Ordinarily, the solution would be used at about room temperature although variation might be made for same purposes such as, for example, to increase or decrease etching rate.

The molarity of the ferricyanide may vary over a considerable range. However, below 0.01 M the etching rate is not usually sufficient for practical applications. Also, above 2 M, all the ferricyanide might not dissolve, especially in view of the fact that other substances must also be added to the etching solution. However, increasing the temperature of the solution increases the limits of solubility. The addition of even small amounts of proton acceptor increases the etch rate of the solution. However, in practical systems the concentration of proton acceptor should be at least equal to 0.1 times the mole concentration of the ferricyanide. Concentrations of proton acceptors beyond 100 times the mole concentration of ferricyanide do not increase the etching rate significantly and are wasteful of material. Also, for uniformity of etch rate a high concentration of proton acceptor is desirable so that the proton acceptor has a preferred concentration range which ranges between a concentration equal to the ferricyanide to 100 times the concentration of ferricyanide.

The process is useful for a wide variety of compositions of tungsten films. Although for many applications high purity of tungsten is desirable, for other applications tungsten content of at least 90 weight percent is satisfactory. Often, the impurities are unintentional since they occur naturally with tungsten (e.g., molybdenum, tantalum, etc.) and need not be removed for a particular application. Other impurities may be intentionally added to improve the properties of the film for a particular application.

Illustrative Examples

An understanding of the invention is facilitated by a number of examples

Example 1: Where high etching rate is not required and a high degree of control of the etching process is desirable, a proton acceptor with a low $K_b$ is used. For example, acetate ion ($Ac^-$) (for example as the alkali-metal acetate) in concentrations of approximately 10 molar (saturated solution) and ferricyanide concentration of 0.25M yields an etch solution of pH = 9 and an etch rate of approximately 1,000 angstroms/min. No conjugate proton donor (HAc in this case) is needed since the pH of the proton acceptor solution is compatible with the photoresist.

Example 2: Another proton acceptor which yields moderate etching rates is pyridine. An etching solution of 0.2M ferricyanide and 1M pyridine has a pH of slightly over 9 and an etching rate of approximately 600 angstroms/min. The pH can be reduced by adding the conjugate proton donor in the form of pyridine hydrochloride, for example, without significant effect on the etch rate.

Example 3: The hydrogen phosphate-dihydrogen phosphate, ($HPO_4^= - H_2PO_4^-$) system is particularly advantageous because of stability especially where moderate etching rate is acceptable. For 0.1M ferricyanide and 0.4M proton acceptor ($HPO_4^=$) and 0.1 conjugate proton donor ($H_2PO_4^-$), the pH is 8 and etch rate is 1,900 angstroms/min. The $HBO_3^= - H_0BO_3^-$ system behaves in much the same way.

Example 4: Higher etch rates are obtained with the $NH_3$-$NH_4Cl$ system. With 0.1M ferricyanide, 0.05M proton acceptor ($NH_3$) and 0.95M conjugate proton donor, the pH is 8 and etch rate 2,800 angstroms/min. Doubling the above concentrations of proton acceptor and conjugate proton donor doubles the etch rate.

Example 5: Relatively fast etching rates are achieved by the use of ethylenediamine as the proton acceptor. With 0.25 ferricyanide and 1.0 M ethylenediamine and 0.9 of the conjugate proton donor (usually added as ethylenediamine hydrochloride), the pH is 8 and etch rate is 12,000 angstroms/min.

Other proton acceptor/proton acceptor — conjugate proton donor systems may be chosen provided $K_b$ is within the limits set above. The illustrative list of proton acceptors with values of $K_b$ is given in *The Handbook of Chemistry and Physics*, The Chemical Rubber Co., Cleveland, Ohio, 45th Edition 1965 p. D–76. More than one proton acceptor may be used for example to adjust etch rate to same desired speed.

Device Fabrication

A large variety of devices can be fabricated using the etching process described herein. For example, where photoresist techniques are used, the photoresist material would be removed from the portion of the tungsten film which is to be removed. The etching solution may then be applied using a variety of techniques. Merely contacting the tungsten film with the etching solution is sufficient to remove the tungsten. However, where high uniformity and minimal undercutting of the photoresist are required, more sophisticated techniques should be used. Such techniques include hand or machine agitation of the sample and spray etching to insure that fresh etching solution is continuously brought in contact with the tungsten surface.

FIG. 1 shows a typical electronic device 10 made in accordance with the inventive procedure. Initially the device consists of a substrate 11 with an overlay of film 12. Then the film is covered with a film of photoresist material. Standard photoresist procedures are used to remove the portions of the photoresist material where metal film is to be etched. The exposed metal film is then removed using the etching process described above. The electronic circuit is then composed of substrate insulating regions 11 and tungsten films 12, as shown in FIG. 1.

In some applications, extremely high resolution of the tungsten thin films is required. Here, special procedures are used to insure uniform etching. First, the etching solution is applied to the surface to be etched using a spraying technique. Uniform application of the spray is particularly important. Also, sufficient volume of sprayed etchant is used to insure continuous renewal of the etching solution on the surface to be etched. This procedure also contributes to more uniform etching and therefore minimizes undercutting, yielding higher resolution in the etching procedure.

High resolution in the etching procedure is ensured if the surface to be etched is rotated during the spraying operation.

Figure 3:
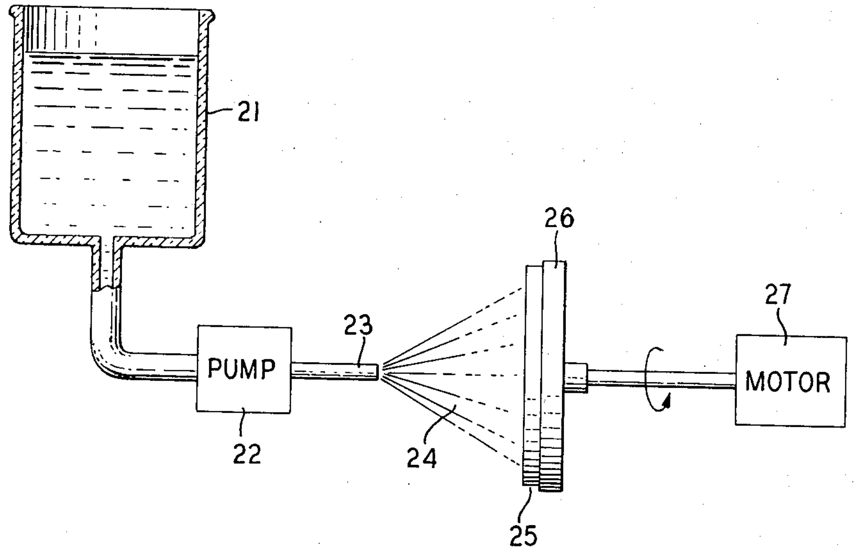
FIG. 3 is a side view of an apparatus for etching tungsten films showing a spraying mechanism for uniform application of etching solution to the sample and a means of rotating the sample so as to obtain greater uniformity in the application of etchant.

FIG. 3 shows a typical apparatus for spraying the etch solution and rotating the sample. A reservoir 21 is provided for the etch solution and a pump 22 to increase the pressure of etching solution against the nozzle 23. Etchant spray 24 is directed against the sample surface 25 to be etched. The sample is mounted on a disk 26 which is rotated by a motor 27.

Etching Rates

Figure 2:
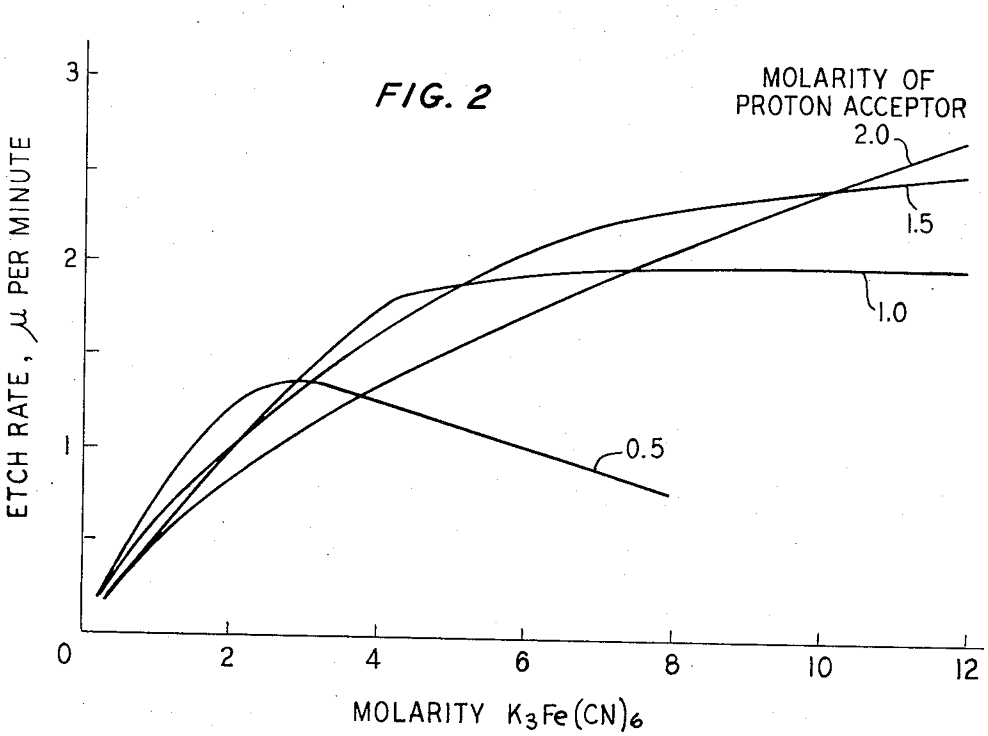
FIG. 2 is a graph showing, on coordinates of etch rate in units of microns/minute vs. molarity of ferricyanide, the relation between etch rate and ferricyanide concentration for several different concentrations of proton acceptor.

The etch rate is a function of many variables including concentration of ferricyanide ion and concentration of base. FIG. 2 shows the dependence of etching rate of ferricyanide concentration for several concentrations of proton acceptor. For purposes of comparison a standard technique of etching is used. This technique involves hand agitation of sputter deposited tungsten films in a beaker filled with the etching solution. For purposes of comparison, the pH of all of the etching solutions is maintained at 8.

In the region where ferricyanide concentration is small compared to the concentration of proton acceptor, etching rate increases rather rapidly with increasing ferricyanide concentration. However, if ferricyanide concentration approaches the concentration of proton acceptor, the etching rate no longer increases as rapidly and in some cases even decreases with increasing ferricyanide concentration. This region of concentration also sometimes shows irregular rates of etching. The importance of adequate concentration of proton acceptor to remove protons liberated in the etching process is therefore apparent.

What is claimed is:

1. A process for the fabrication of devices containing tungsten films in which the tungsten films are etched by wetting the tungsten film with an aqueous solution containing between 0.01 and 2.0 M ferricyanide characterized in that the aqueous solution contains a proton acceptor with basicity constant between $10^{-10}$ and $10^{-2}$ moles/liter in mole concentration between 0.1 and 100 times the mole concentration of ferricyanide and said aqueous solution has a pH between 7 and 10.

2. The process of claim 1 in which the proton acceptor has a basicity constant between $10^{-8}$ and $10^{-3}$.

3. The process of claim 1 in which the concentration of proton acceptor is between 1 and 100 times the mole concentration of ferricyanide.

4. The process of claim 1 in which the proton acceptor is selected from the group consisting of ammonia, ethylenediamine, piperidine, pyridine and acetate.

5. The process of claim 1 in which the proton acceptor is selected from the group consisting of $HPO_4^=$ and $HBO_3^=$.

6. The process of claim 1 in which the aqueous solution is applied to the tungsten film by spraying.

7. The process of claim 6 in which the devices with the tungsten thin film are rotated.

8. The process of claim 1 in which the solution contains conjugate proton donor (substance obtained by adding a proton to the proton acceptor) to lower pH.

* * * * *

Disclaimer 3,772,104.—*Edwin Arthur Chandross*, Murray Hill, and *Theodore Arthur Shankoff*, Mendham, N.J. FABRICATION OF THIN FILM DEVICES. Patent dated Nov. 13, 1973. Disclaimer filed Dec. 17, 1973, by the assignee, *Bell Telephone Laboratories, Incorporated.*

Hereby enters this disclaimer to claims 1 and 2 of said patent.

[*Official Gazette July 8, 1975.*]